US010635230B2

(12) United States Patent
Matsui

(10) Patent No.: US 10,635,230 B2
(45) Date of Patent: Apr. 28, 2020

(54) TOUCH PANEL CONTROL APPARATUS, TOUCH PANEL CONTROL METHOD, AND INPUT DISPLAY APPARATUS

(71) Applicant: SHARP KABUSHIKI KAISHA, Sakai, Osaka (JP)

(72) Inventor: Kuniaki Matsui, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/205,157

(22) Filed: Nov. 29, 2018

(65) Prior Publication Data

US 2019/0163316 A1 May 30, 2019

(30) Foreign Application Priority Data

Nov. 30, 2017 (JP) .................................. 2017-229840

(51) Int. Cl.
*G06F 3/041* (2006.01)
*G02F 1/1333* (2006.01)
*G06F 3/0484* (2013.01)
*G06F 3/044* (2006.01)

(52) U.S. Cl.
CPC ........ *G06F 3/0416* (2013.01); *G02F 1/13338* (2013.01); *G06F 3/044* (2013.01); *G06F 3/0412* (2013.01); *G06F 3/0484* (2013.01); *G06F 3/04184* (2019.05)

(58) Field of Classification Search
CPC ...... G06F 3/0412; G06F 3/0416; G06F 3/044; G06F 3/04184; G06F 3/0484; G02F 1/13338
See application file for complete search history.

(56) References Cited

U.S. PATENT DOCUMENTS 7,576,731 B2 * 8/2009 Okazaki ................ G06F 3/0416
345/173
9,013,421 B2 * 4/2015 Chang ................... G06F 3/0416
345/173

FOREIGN PATENT DOCUMENTS

JP H09-128146 A 5/1997

* cited by examiner

*Primary Examiner* — Muhammad N Edun
(74) *Attorney, Agent, or Firm* — ScienBiziP, P.C.

(57) ABSTRACT

In a touch panel display serving as an input display apparatus, a video signal input into a scaler is converted into a signal meeting a signal input condition of a liquid crystal module. The scaler generates a pseudo horizontal synchronization signal synchronized with a horizontal synchronization signal included in the converted video signal. An amount of delay corresponding to a kind of signal is given to the pseudo horizontal synchronization signal by a delay circuit and the pseudo horizontal synchronization signal is supplied to a touch panel control board. The touch panel control board disables the operation of a touch panel during a predetermined standby period based on a delayed horizontal synchronization signal generated by the delay circuit.

11 Claims, 12 Drawing Sheets

FIG. 2A GCK 
FIG. 2B Tx 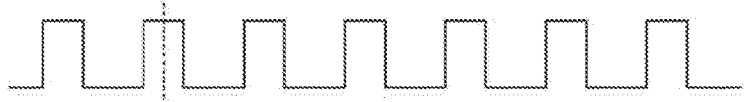
FIG. 2C Rx (RECEPTION SIDE) 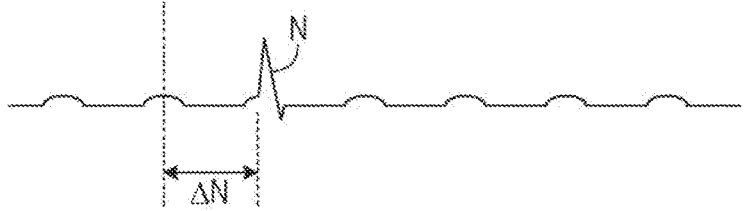
FIG. 3A GCK 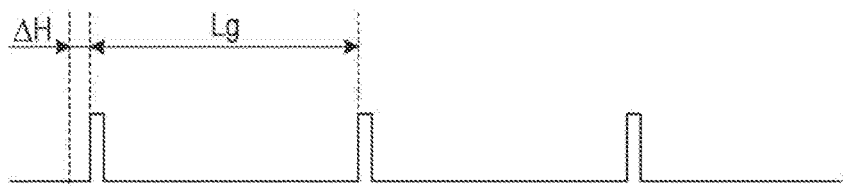
FIG. 3B HS 
FIG. 3C PWM 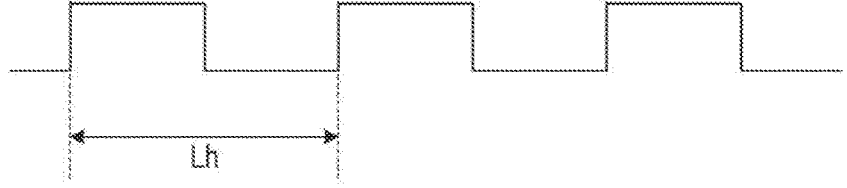

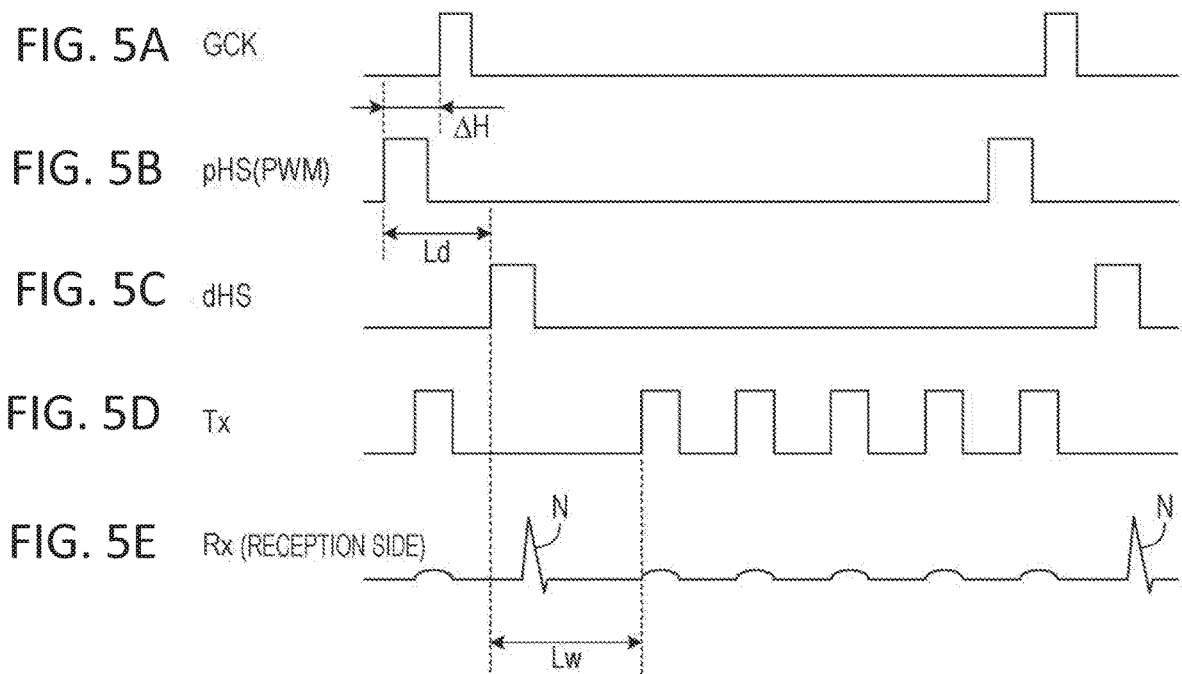

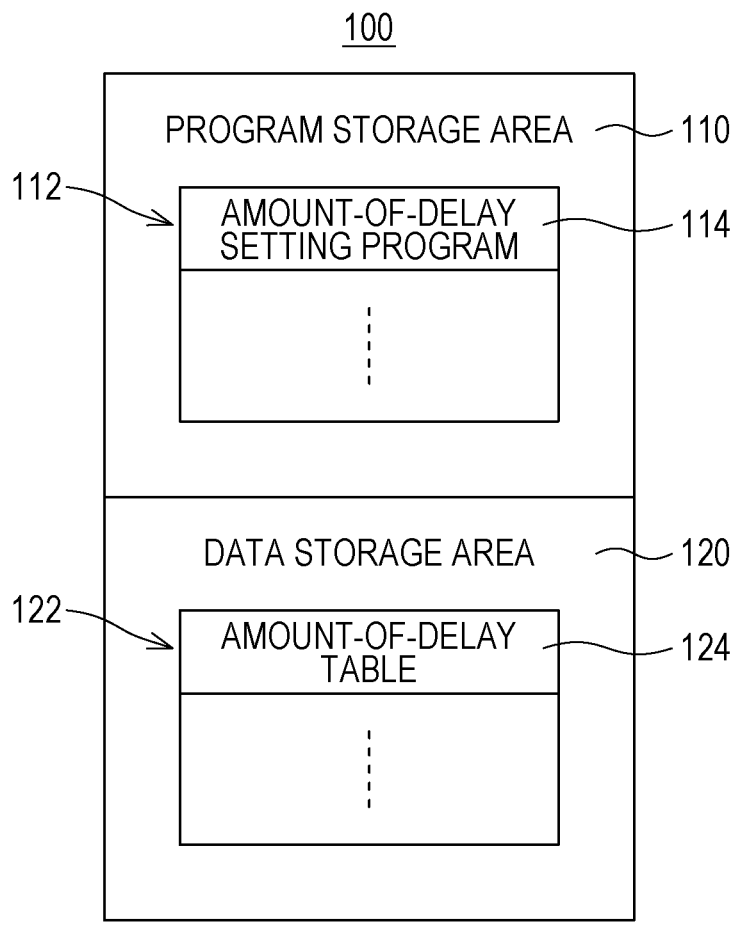

FIG. 12A  GCK
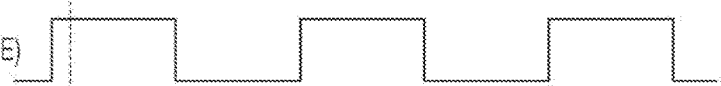
FIG. 12B  pHS (ODD-NUMBER FRAME)
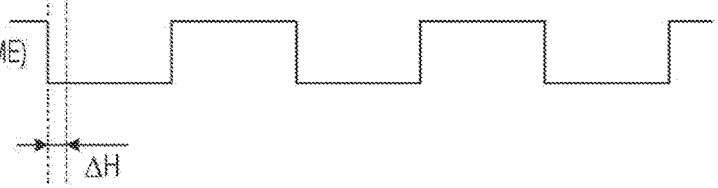
FIG. 12C  pHS (EVEN-NUMBER FRAME)
ΔH
FIG. 13A  GCK
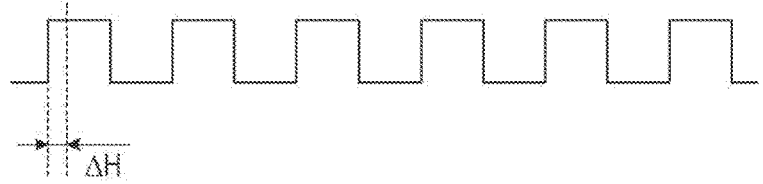
FIG. 13B  mHS
ΔH FIG. 14A GCK 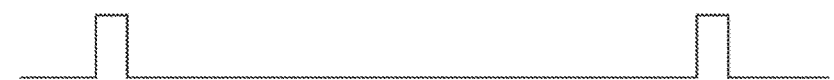
FIG. 14B mHS 
FIG. 14C dHS 
FIG. 14D Tx 
FIG. 14E Rx (RECEPTION SIDE) 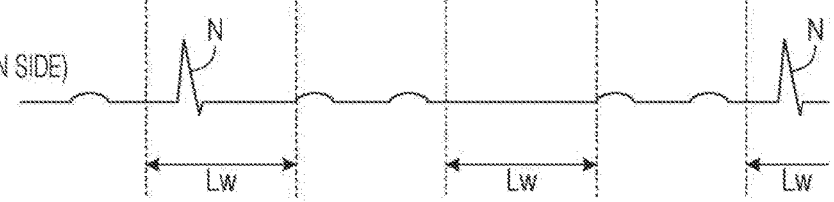

TOUCH PANEL CONTROL APPARATUS, TOUCH PANEL CONTROL METHOD, AND INPUT DISPLAY APPARATUS

BACKGROUND

1. Field

The present disclosure relates to a touch panel control apparatus, a touch panel control method, and an input display apparatus.

2. Description of the Related Art

Touch panels are one kind of pointing devices that are used in combination with display apparatuses. Display apparatuses (input display apparatuses) provided with the touch panels are called touch panel displays and are used in various apparatuses, such as various electronic systems and home electric appliances, including mobile devices.

A touch panel display in which a capacitive touch panel is combined with an active matrix drive liquid crystal display apparatus is known. In this combination, the touch panel is provided so that the screen of the liquid crystal display apparatus is overlaid with the touch panel and, in response to a touch operation by a user, outputs a position signal corresponding to the position of the touch operation by the user. Here, noise may occur in the position signal from the touch panel due to driving of the gate of the liquid crystal display apparatus (the gate of a thin film transistor (TFT) serving as a switching element (active element) disposed in each pixel). This gate driven noise is likely to occur as the sensor surface of the touch panel is increased in size, that is, as the screen of the liquid crystal display apparatus is increased in size. When the gate driven noise occurs, for example, touching of the touch panel by the user may be falsely recognized even in a case in which the touch panel is not touched by the user. In other words, the touch panel may malfunction.

In order to avoid the influence of such gate driven noise, for example, a technology disclosed in Japanese Unexamined Patent Application Publication No. 9-128146 is proposed in related art. In the technology disclosed in Japanese Unexamined Patent Application Publication No. 9-128146, a timing detection circuit is provided, which detects coincidence between the timing when output of a liquid crystal driving signal from a liquid crystal driver that drives the screen of the liquid crystal display apparatus is varied and predetermined timing when output data from the touch panel is acquired. If the coincidence is not detected by the timing detection circuit, the output data from the touch panel is acquired at predetermined timing. In contrast, if the coincidence is detected by the timing detection circuit, the output data from the touch panel is acquired at timing different from the predetermined timing. Accordingly, the output data from the touch panel is inhibited from being acquired at the timing when the output of the liquid crystal driving signal from the liquid crystal driver is varied, that is, at the timing when the gate of the liquid crystal display apparatus is driven. As a result, the influence of the gate driven noise is avoided.

The touch panel display in which the capacitive touch panel is combined with the active matrix drive liquid crystal display apparatus may be used for an information display installed in, for example, a showroom or a public facility. In addition, the touch panel display may be used for an electronic blackboard (an interactive white board) used in, for example, an education field or an office. In the touch panel display used for the information display or the electronic blackboard, it is desirable to support input of video signals conforming to various standards, such as Display Port (DP) and High-Definition Multimedia Interface (HDMI) (registered trademark), that is, video signals of multiple kinds. In order to meet such a request, a scaler is generally used. The scaler is a conversion unit that converts each of the video signals of multiple kinds into a signal meeting a signal input condition of the liquid crystal display apparatus and supplies the converted signal to the liquid crystal display apparatus. Provision of such a scaler realizes a touch panel display capable of supporting input of the video signals of multiple kinds.

It is desirable to avoid the influence of the gate driven noise also in the touch panel display capable of supporting input of the video signals of multiple kinds. However, the timing when the gate of the liquid crystal display apparatus is driven may be varied, that is, the timing when the gate driven noise occurs may be varied depending on the kind of the video signal. Accordingly, in order to avoid the influence of the gate driven noise, it is desirable to take appropriate measures according to the kind of the video signal. The gate driven noise notably occurs as the distance between the touch panel and the screen of the liquid crystal display apparatus is decreased, particularly in a structure in which the touch panel is provided on the screen of the liquid crystal display apparatus through known direct bonding. Accordingly, it is desirable to avoid the influence of the gate driven noise more reliably in the structure adopting the direct bonding. Application to the touch panel display capable of supporting input of the video signal of multiple kinds is not supposed in the technology disclosed in Japanese Unexamined Patent Application Publication No. 9-128146. Accordingly, there is a disadvantage in that, for example, the influence of the gate driven noise is avoided when the video signal of a certain kind is input but the influence of the gate driven noise is not avoided when the video signal of another kind is input. In other words, it is not possible to reliably avoid the influence of the gate driven noise in the touch panel display supporting input of the video signals of multiple kinds with the technology disclosed in Japanese Unexamined Patent Application Publication No. 9-128146.

It is desirable to provide a technology capable of reliably avoiding the influence of the gate driven noise in an input display apparatus that is capable of supporting input of the video signals of multiple kinds.

SUMMARY

According to an aspect of the disclosure, there is provided a touch panel control apparatus. A touch panel to be controlled by the touch panel control apparatus is provided so that a screen of a display apparatus is overlaid with the touch panel and outputs a position signal corresponding to a position where the touch panel is touched by a user. The touch panel control apparatus includes a conversion circuit, a first generation circuit, a delay circuit, and a disabling control circuit. The conversion circuit is capable of accepting input of first video signals of multiple kinds. The conversion circuit converts the first video signal that is input into a second video signal meeting a signal input condition of the display apparatus and supplies the second video signal after the conversion to the display apparatus. The first generation circuit generates a first synchronization signal synchronized with a horizontal synchronization signal included in the second video signal. The delay circuit gives an amount of delay corresponding to a kind of the first video signal input into the conversion circuit to the first synchronization signal. The disabling control circuit disables an operation of the touch panel during a predetermined disabled period based on a delayed signal generated by the delay circuit. The amount of delay given by the delay circuit is set in advance so that a period when noise appearing in the position signal due to driving of a gate of the display apparatus, that is, gate driven noise occurs is within the disabled period.

According to another aspect of the disclosure, there is provided a touch panel control method. A touch panel to be controlled using the touch panel control method is also provided so that a screen of a display apparatus is overlaid with the touch panel and also outputs a position signal corresponding to a position where the touch panel is touched by a user, as in the touch panel control apparatus. The touch panel control method includes converting a first video signal that is input into a second video signal meeting a signal input condition of the display apparatus and supplying the second video signal after the conversion to the display apparatus, input of first video signals of multiple kinds being capable of accepted in the converting; generating a first synchronization signal synchronized with a horizontal synchronization signal included in the second video signal; giving an amount of delay corresponding to a kind of the first video signal that is input in the converting to the first synchronization signal; and disabling an operation of the touch panel during a predetermined disabled period based on a delayed signal generated in the giving of the amount of delay. The amount of delay is set in advance so that a period when noise appearing in the position signal due to driving of a gate of the display apparatus, that is, gate driven noise occurs is within the disabled period.

According to another aspect of the disclosure, there is provided an input display apparatus. The input display apparatus includes a display apparatus that displays information on its screen, a touch panel, and the touch panel control apparatus. The touch panel is provided so that the screen of the display apparatus is overlaid with the touch panel and outputs a position signal corresponding to a position where the touch panel is touched by a user, like the touch panels to be controlled in the above aspects.

BRIEF DESCRIPTION OF THE DRAWINGS

FIGS. 2A to 2C are waveform diagrams schematically illustrating an example of a gate clock signal, a driving signal for a touch panel, and gate driven noise, respectively, in the touch panel display in the related art;

FIGS. 3A to 3C are waveform diagrams schematically illustrating an example of the gate clock signal, a horizontal synchronization signal output from a scaler, and a PWM signal output from the scaler, respectively, in the touch panel display in the related art;

FIGS. 5A to 5E are waveform diagrams schematically illustrating an example of main signals in the first embodiment;

FIG. 6 is a memory map conceptually illustrating the structure in a memory in an MCU on a main interface board in the first embodiment;

FIG. 7 conceptually illustrates an amount-of-delay table stored in the memory in the MCU on the main interface board in the first embodiment;

FIGS. 12A to 12C are waveform diagrams schematically illustrating an example of a state in which the phase relationship between a gate clock signal and a pseudo horizontal synchronization signal is shifted in the second embodiment;

FIGS. 13A and 13B are waveform diagrams schematically illustrating an example of the gate clock signal and a multiplied synchronization signal, respectively, in the second embodiment;

FIGS. 14A to 14E are waveform diagrams schematically illustrating an example of main signals in the second embodiment.

DESCRIPTION OF THE EMBODIMENTS

First Embodiment

The present disclosure is applied to, for example, a touch panel display. A touch panel display in the related art will now be described before the touch panel display to which the present disclosure is applied is described.

Figure 1:
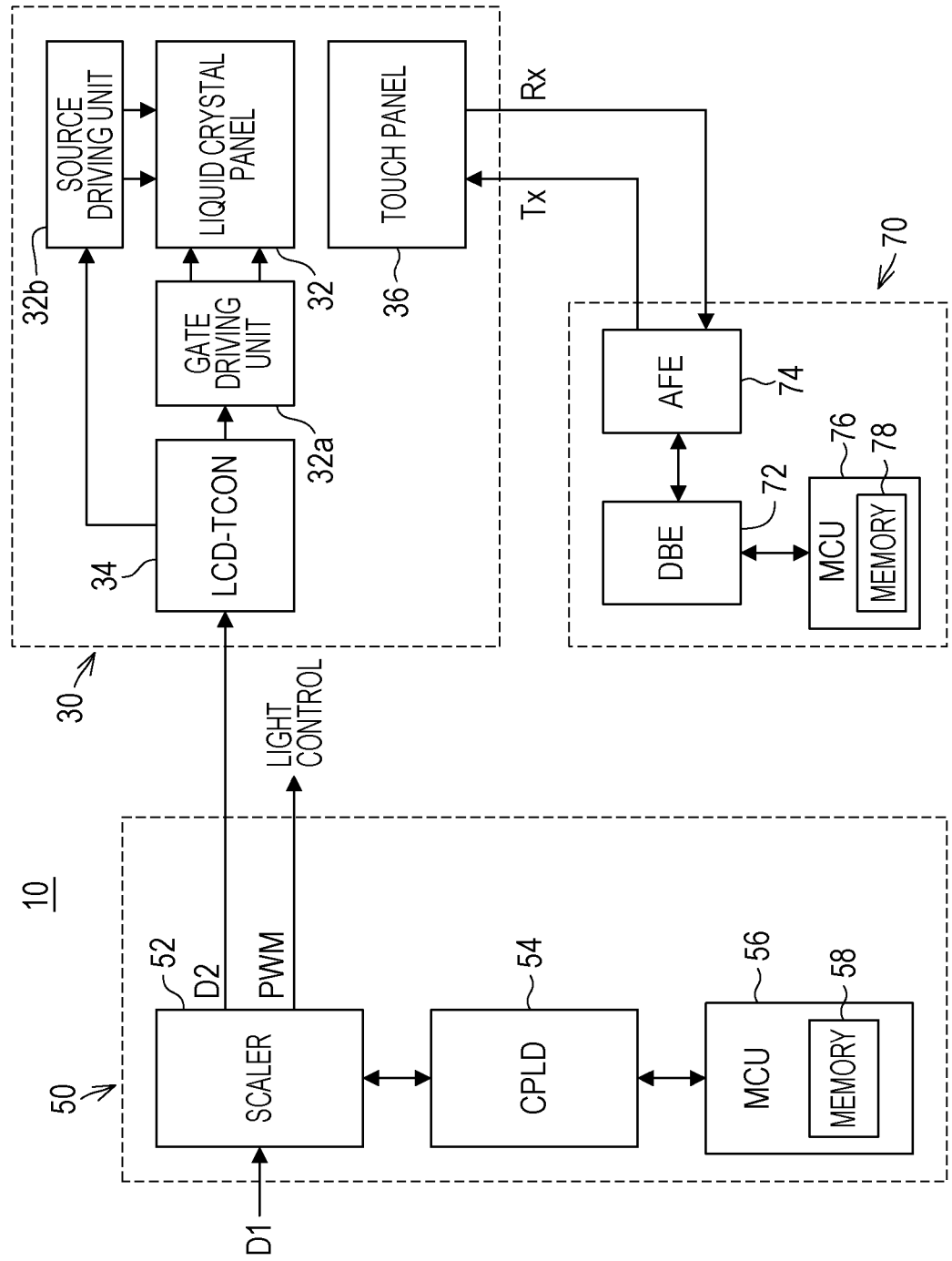
FIG. 1 is a block diagram schematically illustrating a configuration of an electrical portion of a touch panel display in the related art.

FIG. 1 is a block diagram schematically illustrating a configuration of an electrical portion of a touch panel display 10 in the related art. Referring to FIG. 1, the touch panel display 10 includes a liquid crystal module 30, a main interface board 50, and a touch panel control board 70.

The liquid crystal module 30 includes an active matrix drive liquid crystal panel 32, a gate driving unit 32a, a source driving unit 32b, a liquid crystal display-timing controller (LCD-TCON) 34, and a touch panel 36.

The liquid crystal panel 32 is composed of, for example, a polarizing filter, a glass substrate, a liquid crystal layer, and a backlight although a detailed description of them is omitted herein. The liquid crystal panel 32 forms a screen (an image display portion) on which information, such as a video described below, is displayed. The number of horizontal pixels× the number of vertical pixels of the screen are, for example, about 1,920× about 1,080 or about 3,840× about 2,160. For example, wiring including gate lines (scanning lines) and source lines (data lines), thin film transistors, electrodes are formed on the glass substrate.

Gate line control signals including a gate clock signal GCK and a gate start pulse signal GSP are supplied from the liquid crystal display-timing controller 34 to the gate driving unit 32a, as described below. The gate driving unit 32a controls the thin film transistors in accordance with the gate line control signals so that the thin film transistors of the liquid crystal panel 32 are switched on in the order of the gate lines.

A source line control signal is supplied from the liquid crystal display-timing controller 34 to the source driving unit 32b, as described below, and an image data signal DT is supplied from the liquid crystal display-timing controller 34 to the source driving unit 32b. The source driving unit 32b supplies the image data signal DT to each source line in accordance with the source line control signal. As a result, voltage corresponding to the image data signal DT is applied to the pixels (liquid crystals) corresponding to the thin film transistors that are switched on, that is, writing of data is performed.

The liquid crystal display-timing controller 34 controls the gate driving unit 32a and the source driving unit 32b based on a converted video signal D2 described below so that a video corresponding to the converted video signal D2 is displayed on the screen of the liquid crystal panel 32. Specifically, the liquid crystal display-timing controller 34 supplies the gate line control signals including the gate clock signal GCK and the gate start pulse signal GSP described above to the gate driving unit 32a. In addition, the liquid crystal display-timing controller 34 supplies the source line control signal and the image data signal DT to the source driving unit 32b.

The touch panel 36 is of a mutual capacitance type, among projected capacitive types. The touch panel 36 has a capacitive sensor sheet although a detailed description of the capacitive sensor sheet is omitted herein and is provided so that the screen of the liquid crystal panel 32 is overlaid with the touch panel 36 through the direct bonding. The touch panel 36 includes a driving electrode and a reception electrode. A driving signal Tx described below for driving the touch panel 36 is supplied to the driving electrode. When the touch panel 36 is touched by the user in a state in which the driving signal Tx is supplied, the touch panel 36 outputs a position signal Rx corresponding to the position where the touch panel 36 is touched by the user from the reception electrode. The position signal Rx is a current signal.

The main interface board 50 is provided with a scaler (a video signal conversion unit) 52, a complex programmable logic device (CPLD) 54, and a micro control unit (MCU) 56. The scaler 52 is capable of accepting input of video signals D1 conforming to various standards, such as Display Port and HDMI, that is, the video signals D1 of multiple kinds. The scaler 52 converts the video signal that is actually input into the scaler 52 into the signal D2 meeting a signal input condition of the liquid crystal module 30 and supplies the converted video signal D2 to the liquid crystal module 30, specifically to the liquid crystal display-timing controller 34. A horizontal synchronization signal HS, a vertical synchronization signal VS, a dot clock signal DCK, the image data signal DT, and so on are included in the converted video signal D2. In addition, the scaler 52 has a function to output a pulse width modulation (PWM) signal. The PWM signal is used as a light control signal for adjusting the brightness of the backlight (not illustrated) of the liquid crystal panel 32. A signal synchronized with the horizontal synchronization signal HS included in the converted video signal D2 is output as the PWM signal. In other words, the scaler 52 has a function to generate the PWM signal synchronized with the horizontal synchronization signal HS. More specifically, the scaler 52 has a function to generate a pulse signal in another aspect, which is synchronized with the horizontal synchronization signal HS, in addition to the PWM signal.

Such a scaler 52 is realized by, for example, an application specific integrated circuit (ASIC).

The CPLD 54 is connected to the scaler 52. The CPLD 54 has a function to increase the number of input-output ports of the main interface board 50, for example, including input-output ports of the scaler 52. The CPLD 54 also functions as a bus selector that divides a bus line on the main interface board 50 into multiple sub-lines and switches between the sub-lines. In addition, the CPLD 54 has a function to generate various pulse signals used as reference signals in peripheral circuits. The CPLD 54 has versatile functions, as described above.

The MCU 56 controls appropriate elements including the CPLD 54, which are mounted on the main interface board 50. In other words, the above functions of the CPLD 54 are realized under the control of the MCU 56. The MCU 56 includes a memory 58. A control program 112 described below for controlling the operation of the MCU 56 is stored in the memory 58.

The touch panel control board 70 is provided with a digital back end (DBE) 72, an analog front end (AFE) 74, and an MCU 76. The DBE 72 generates the driving signal Tx described above in cooperation with the AFE 74 and supplies the driving signal Tx to the touch panel 36. In addition, the DBE 72 accepts input of the position signal Rx from the touch panel 36 and generates a position data signal representing the position where the touch panel 36 is touched by the user based on the position signal Rx and the driving signal Tx, in cooperation with the AFE 74. The position data signal is supplied to a main MCU (not illustrated) in the touch panel display 10 to be subjected to appropriate processing in the main MCU. The MCU 76 on the touch panel control board 70 controls appropriate elements including the DBE 72, which are mounted on the touch panel control board 70. For example, the period of the pulsed driving signal Tx, the number of times in which the driving signal Tx is scanned, the switching period of the driving signal Tx and the position signal Rx (that is, the switching period of the driving electrode and the reception electrode), and so on are determined by the operation of the DBE 72. The operation of the DBE 72 is controlled by the MCU 76. The MCU 76 includes a memory 78. A touch panel control program 212 described below for controlling the operation of the MCU 76 is stored in the memory 78.

In the touch panel display 10, any of the video signals D1 of multiple types conforming to Display Port, HDMI, and so on is supplied to the scaler 52. The scaler 52 converts the video signal D1 that is input into scaler 52 into the converted video signal D2 and supplies the converted video signal D2 to the liquid crystal display-timing controller 34. The liquid crystal display-timing controller 34 controls the gate driving unit 32a and the source driving unit 32b based on the converted video signal D2 so that the liquid crystal panel 32 is driven in the active matrix drive method. Accordingly, the gate line control signals including the gate clock signal GCK and the gate start pulse signal GSP are supplied from the liquid crystal display-timing controller 34 to the gate driving unit 32a, as described above. In addition, the source line control signal and the image data signal DT are supplied from the liquid crystal display-timing controller 34 to the source driving unit 32b. In response to these signals, the gate driving unit 32a appropriately controls the thin film transistors of the liquid crystal panel 32 and the source driving unit 32b appropriately performs the writing of data onto each pixel. As a result, a video corresponding to the converted video signal D2 is displayed on the screen of the liquid crystal panel 32. In other words, the touch panel display 10 capable of supporting input of the video signals D1 of multiple types is realized.

Concurrently with this, the driving signal Tx is supplied from the touch panel control board 70 to the touch panel 36. When the touch panel 36 is touched by the user in this state, the touch panel 36 outputs the position signal Rx corresponding to the position where the touch panel 36 is touched by the user. The position signal Rx is supplied to the touch panel control board 70 and is used in the process of generating the position data signal described above along with the driving signal Tx.

In the touch panel display 10, gate driven noise N caused by the driving of the gate of the liquid crystal panel 32 (the gates of the thin film transistors) may occur at the reception side of the AFE 74, to which the position signal Rx is supplied. The gate driven noise N is likely to occur as the sensor surface of the touch panel 36 is increased in size, that is, as the screen of the liquid crystal panel 32 is increased in size. The gate driven noise N notably occurs as the distance between the touch panel 36 and the screen of the liquid crystal panel 32 is decreased, particularly in a structure in which the touch panel 36 is provided on the screen of the liquid crystal panel 32 through the direct bonding. If the gate driven noise N occurs, for example, touching of the touch panel 36 by the user may be falsely recognized even in a case in which the touch panel 36 is not touched by the user. In other words, the touch panel 36 (strictly, a touch panel system including the touch panel 36 and the touch panel control board 70) may malfunction. Accordingly, it is desirable to avoid the influence of the gate driven noise N.

The gate driven noise N occurs at timing synchronized with the gate clock signal GCK described above for driving the gate of the liquid crystal panel 32, strictly at timing that is delayed from the gate clock signal GCK by a fixed time delay AN. This state is illustrated in FIGS. 2A to 2C. FIG. 2A illustrates the gate clock signal GCK and FIG. 2B illustrates the driving signal Tx for the touch panel 36. FIG. 2C illustrates a waveform at the reception side of the AFE 74, to which the position signal Rx is supplied, when the touch panel 36 is not touched by the user. As illustrated in FIG. 2C, the gate driven noise N occurs at the reception side of the AFE 74, to which the position signal Rx from the touch panel 36 is supplied, even in the case in which the touch panel 36 is not touched by the user. The time delay AN of the gate driven noise N from the gate clock signal GCK is caused by, for example, the responsiveness of the liquid crystal panel 32 and the responsiveness of the touch panel 36 and is fixed, as described above.

It is supposed that the influence of the gate driven noise N is capable of being avoided by estimating the timing when the gate driven noise N occurs based on, for example, the gate clock signal GCK from the relationship between the gate driven noise N and the gate clock signal GCK. However, the gate clock signal GCK is generally generated in the liquid crystal module 30 and is not externally output from the liquid crystal module 30. Accordingly, the avoidance of the influence of the gate driven noise N by estimating the timing when the gate driven noise N occurs based on the gate clock signal GCK is not a realistic way.

The gate clock signal GCK is synchronized with the horizontal synchronization signal HS included in the converted video signal D2 input into the liquid crystal module 30 and has a fixed phase difference AH from the horizontal synchronization signal HS. In addition, the scaler 52 has the function to output the PWM signal synchronized with the horizontal synchronization signal HS, as described above.

FIGS. 3A to 3C illustrates an example of the relationship between the gate clock signal GCK, the horizontal synchronization signal HS, and the PWM signal. FIG. 3A illustrates the gate clock signal GCK, FIG. 3B illustrates the horizontal synchronization signal HS, and FIG. 3C illustrates the PWM signal.

From the relationship illustrated in FIGS. 3A to 3C, it is supposed that the influence of the gate driven noise N is capable of being avoided by estimating the timing when the gate driven noise N occurs based on the PWM signal. However, a period Lh of the horizontal synchronization signal HS included in the converted video signal D2, that is, a period Lg (=Lh) of the gate clock signal GCK may be varied depending on the kind of the video signal D1 on which the converted video signal D2 is based. As a result, the phase difference AH between the horizontal synchronization signal HS and the gate clock signal GCK is varied, that is, the phase difference AH between the PWM signal and the gate clock signal GCK is varied, thus varying the phase relationship between the PWM signal and the gate driven noise N. In other words, the timing when the gate driven noise N occurs may be varied depending on the kind of the video signal D1 that is input into the scaler 52. In order to address the gate driven noise N, the following devices are made in a touch panel display 10a according to a first embodiment.

Figure 4:
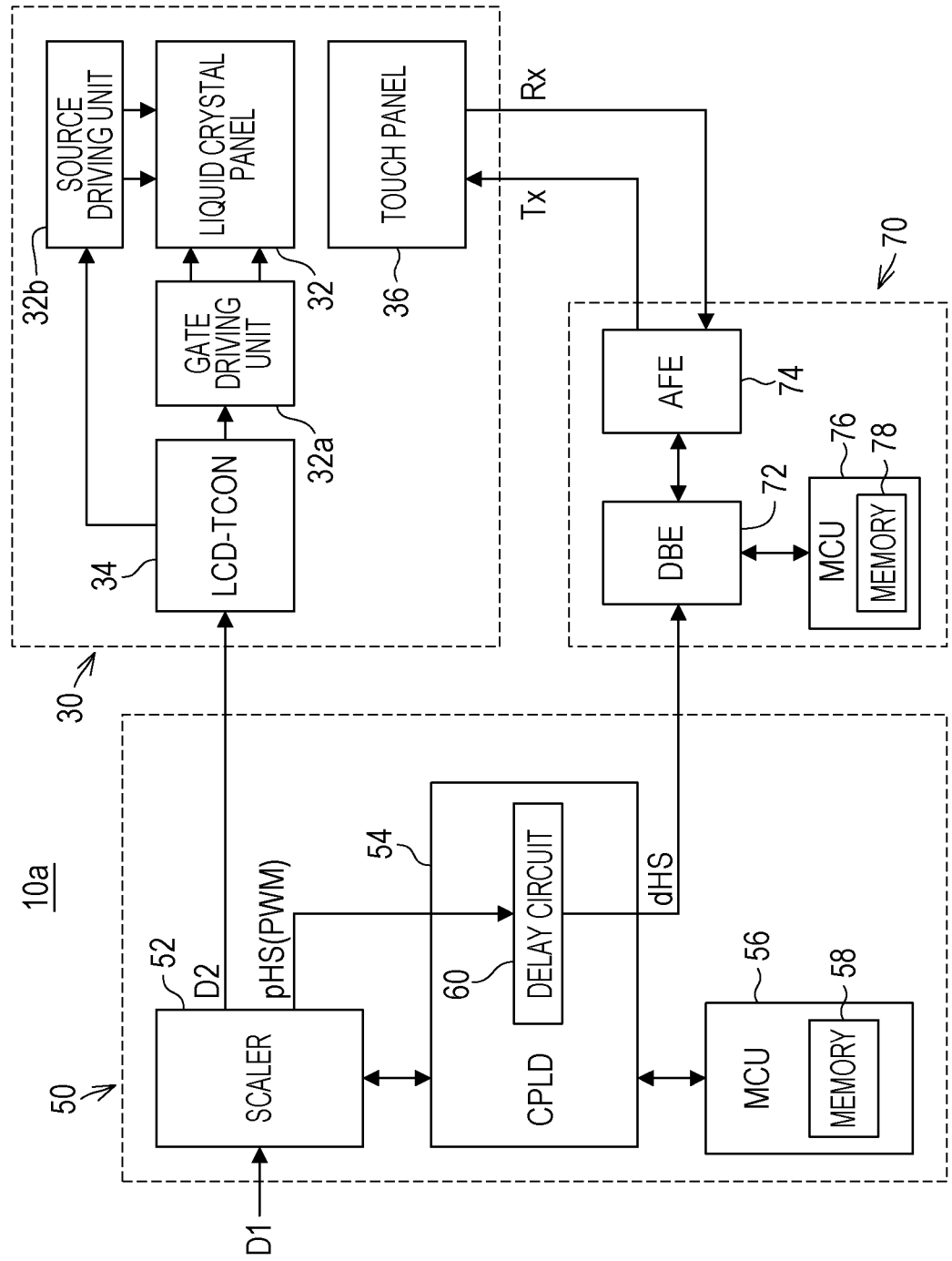
FIG. 4 is a block diagram schematically illustrating a configuration of an electrical portion of a touch panel display according to a first embodiment of the present disclosure.

The touch panel display 10a according to the first embodiment results from appropriate modification of the touch panel display 10 in the related art in order to address the gate driven noise N. Specifically, a delay circuit 60 is formed by the CPLD 54 in the touch panel display 10a according to the first embodiment, as illustrated in FIG. 4. The CPLD 54 has logic circuits of a number sufficient to form the delay circuit 60, in addition to the versatile functions described above. Accordingly, the MCU 56, which controls the CPLD 54, is appropriately modified and the control program 112 stored in the memory 58 in the MCU 56 is appropriately modified. In addition, the DBE 72 on the touch panel control board 70 is appropriately modified. Furthermore, the MCU 76 controlling the DBE 72 is appropriately modified and the touch panel control program 212 stored in the memory 78 in the MCU 76 is appropriately modified. The PWM signal described above is used as a pseudo horizontal synchronization signal pHS described below, instead of the light control signal. Instead of the PWM signal, another light control signal is prepared by, for example, the scaler 52. Since this light control signal is not directly related to the present disclosure, a further description of the light control signal is omitted herein. The remaining components in the touch panel display 10a according to the first embodiment are the same as those in the touch panel display 10 in the related art. Accordingly, the same reference numerals are used in the touch panel display 10a to identify the same components in the touch panel display 10 and a description of such components is also omitted herein.

Referring to FIG. 4, the scaler 52 outputs the PWM signal described above as the pseudo horizontal synchronization signal pHS. The pseudo horizontal synchronization signal pHS is supplied to the delay circuit 60. An amount-of-delay Ld is given to the pseudo horizontal synchronization signal pHS input into the delay circuit 60 by the delay circuit 60. The amount-of-delay Ld given by the delay circuit 60 is set by the MCU 56.

A delayed horizontal synchronization signal dHS, which is a signal after the amount-of-delay Ld is given by the delay circuit 60, is supplied to the DBE 72 on the touch panel control board 70. Although the DBE 72 generates the driving signal Tx described above in cooperation with the AFE 74, input of the driving signal Tx into the touch panel 36 is stopped during a predetermined standby period Lw based on the delayed horizontal synchronization signal dHS. As a result, the touch panel 36 is in a standby state during the standby period Lw based on the delayed horizontal synchronization signal dHS. In other words, the operation of the touch panel 36 is disabled during the standby period Lw. The influence of the gate driven noise N is avoided if the timing when the gate driven noise N occurs is within the standby period Lw, specifically, if the period during which the gate driven noise N occurs is within the standby period Lw. FIGS. 5A to 5E illustrate an example of this state.

Here, it is assumed that the phase difference AH described above (refer to FIGS. 3A to 3C) exists between the gate clock signal GCK illustrated in FIG. 5A and the pseudo horizontal synchronization signal pHS illustrated in FIG. 5B. The pulse width of the pseudo horizontal synchronization signal pHS illustrated in FIG. 5B is made narrow (is made narrower than that of the PWM signal illustrated FIG. 3C). Giving the amount-of-delay Ld to the pseudo horizontal synchronization signal pHS by the delay circuit 60 generates the delayed horizontal synchronization signal dHS illustrated in FIG. 5C. Input of the driving signal Tx illustrated in FIG. 5D into the touch panel 36 is stopped, specifically, the generation of the pulse of the driving signal Tx is stopped during the predetermined standby period Lw, based on the delayed horizontal synchronization signal dHS, for example, using a rising edge of the delayed horizontal synchronization signal dHS as a reference point (base point). In contrast, the gate driven noise N occurs at the reception side of the AFE 74 to which the position signal Rx from the touch panel 36 is supplied, illustrated in FIG. 5E. Here, the influence of the gate driven noise N is avoided if the timing when the gate driven noise N occurs, specifically, the period during which the gate driven noise N occurs is within the standby period Lw.

The timing when the standby period Lw is formed, for example, the start time point of the standby period Lw is determined by the amount-of-delay Ld given by the delay circuit 60. Accordingly, the influence of the gate driven noise N is avoided by determining the amount-of-delay Ld given by the delay circuit 60 in advance so that the period during which the gate driven noise N occurs is within the standby period Lw. However, as described above, the timing when the gate driven noise N occurs may be varied depending on the kind of the video signal D1 input into the scaler 52. This means that the appropriate amount-of-delay Ld given by the delay circuit 60, which is set so that the period during which the gate driven noise N occurs is within the standby period Lw, may be varied depending on the kind of the video signal D1 input into the scaler 52.

Accordingly, in the first embodiment, the appropriate amount-of-delay Ld given by the delay circuit 60 is determined in advance through, for example, an experiment for each of the video signals D1 of multiple kinds input of which is capable of being accepted by the scaler 52. The appropriate amounts of delay Ld that are determined in advance are stored in the memory 58 in the MCU 56 in a tabular format. The MCU 56 reads out the amount-of-delay Ld corresponding to the kind of the video signal D1 input into the scaler 52 from the memory 58 and sets the amount-of-delay Ld that is read out in the delay circuit 60. As a result, the appropriate amount-of-delay Ld corresponding to the kind of the video signal D1 input into the scaler 52 is set in the delay circuit 60 regardless of the kind of the video signal D1 input into the scaler 52, among the video signals D1 of multiple kinds, to avoid the influence of the gate driven noise N. The amount-of-delay Ld given by the delay circuit 60 is determined by, for example, the number of flip-flops in the CPLD 54 forming the delay circuit 60.

A memory map 100 in FIG. 6 conceptually illustrates the structure in the memory 58 in the MCU 56. As illustrated in FIG. 6, the memory 58 in the MCU 56 includes a program storage area 110 and a data storage area 120. The control program 112 described above is stored in the program storage area 110. The control program 112 includes an amount-of-delay setting program 114. The amount-of-delay setting program 114 is used to set the appropriate amount-of-delay Ld in the delay circuit 60 in the above manner.

A variety of data 122 is stored in the data storage area 120. For example, an amount-of-delay table 124 is stored as the table described above. Multiple amounts of delay Ld Ld[1], Ld[2], Ld[3], . . . corresponding to the video signal D1 of multiple kinds D1[1], D1[2], D1[3], . . . are stored in the amount-of-delay table 124 in a state in which the multiple amounts of delay Ld are associated with the video signals D1 of multiple kinds, as illustrated in FIG. 7. More strictly, the number of flip-flops in the CPLD 54 forming the delay circuit 60 is stored as the amounts of delay Ld (Ld[1], Ld[2], Ld[3], . . . ).

The MCU 56 sets the appropriate amount-of-delay Ld corresponding to the kind of the video signal D1 input into the scaler 52 in the delay circuit 60 with reference to the amount-of-delay table 124 in the above manner. Accordingly, the setting of the appropriate amount-of-delay Ld in the delay circuit 60 is instantaneously performed and the preparation for avoidance of the influence of the gate driven noise N is instantaneously made. This is very useful when the video signal D1 to be input into the scaler 52 is switched, that is, when the kind of the video signal D1 is switched from one kind to another kind.

Specifically, when the video signal D1 to be input into the scaler 52 is switched, the appropriate amount-of-delay Ld corresponding to the video signal D1 is instantaneously set in the delay circuit 60 and the preparation for avoidance of the influence of the gate driven noise N is instantaneously made in response to the switching. Then, the video signal D1 is converted into the converted video signal D2 by the scaler 52 and the converted video signal D2 is supplied to the liquid crystal module 30. In other words, the preparation for avoidance of the influence of the gate driven noise N is made before the liquid crystal panel 32 is driven, that is, before the gate driven noise N occurs. Accordingly, the influence of the gate driven noise N is avoided also when the video signal D1 to be input into the scaler 52 is switched.

In contrast, a configuration is assumed in which the timing when the gate driven noise N occurs is estimated, for example, based on the gate clock signal GCK to avoid the influence of the gate driven noise N. The following disadvantage is caused in the assumed configuration. Specifically, in the assumed configuration, the preparation for avoidance of the influence of the gate driven noise N is made after the gate clock signal GCK is generated, that is, after the gate driven noise N occurs. Accordingly, the influence of the gate driven noise N is not capable of being avoided when the video signal D1 to be input into the scaler 52 is switched in the assumed configuration.

As described above, according to the first embodiment, the influence of the gate driven noise N is capable of being avoided also when the video signal D1 to be input into the scaler 52 is switched. The first embodiment is very useful also in this point.

Figure 8:
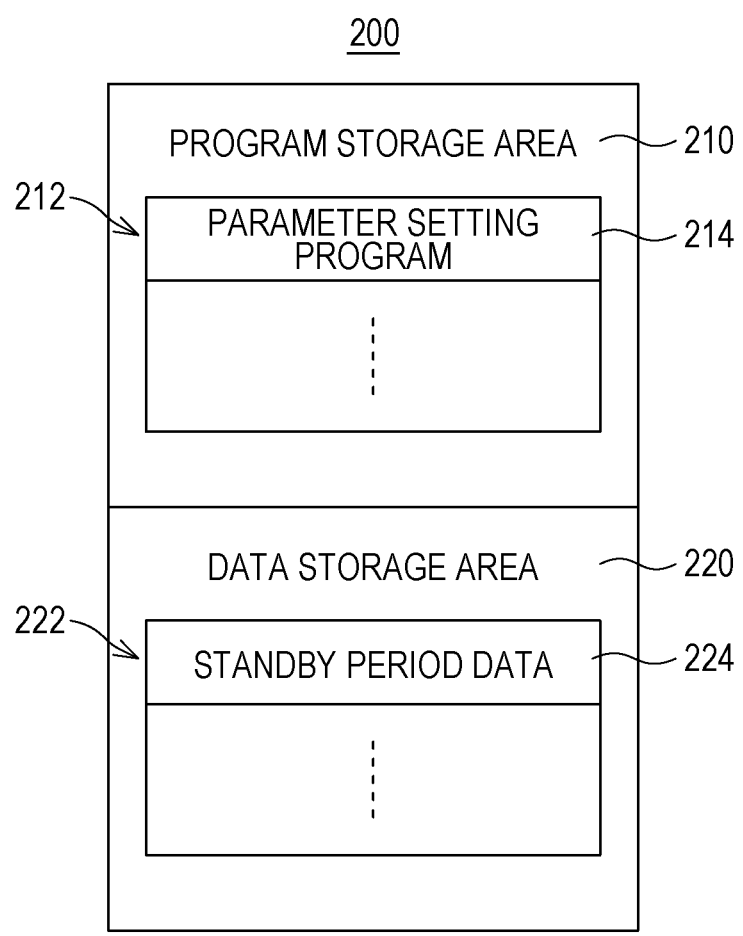
FIG. 8 is a memory map conceptually illustrating the structure in a memory in an MCU on a touch panel control board in the first embodiment.

A memory map 200 in FIG. 8 conceptually illustrates the structure in the memory 78 in the MCU 76 on the touch panel control board 70. As illustrated in FIG. 8, the memory 78 in the MCU 76 includes a program storage area 210 and a data storage area 220, as in the memory 58 in the MCU 56 on the main interface board 50. The touch panel control program 212 described above is stored in the program storage area 210. The touch panel control program 212 includes a parameter setting program 214. The parameter setting program 214 is used to set various parameters, such as the standby period Lw, which are used to control the operation of the DBE 72.

A variety of data 222 is stored in the data storage area 220. For example, standby period data 224 is stored in the data storage area 220. The standby period Lw corresponding to the standby period data 224 is set in the DBE 72. The standby period Lw is determined in advance through, for example, an experiment. However, the sensitivity of the touch panel 36 is reduced as the standby period Lw is made longer, that is, the period during which the operation of the touch panel 36 is disabled is made longer. Accordingly, the standby period Lw is set so as to have a length sufficient to avoid the influence of the gate driven noise N and is made shorter, if possible.

Figure 9:
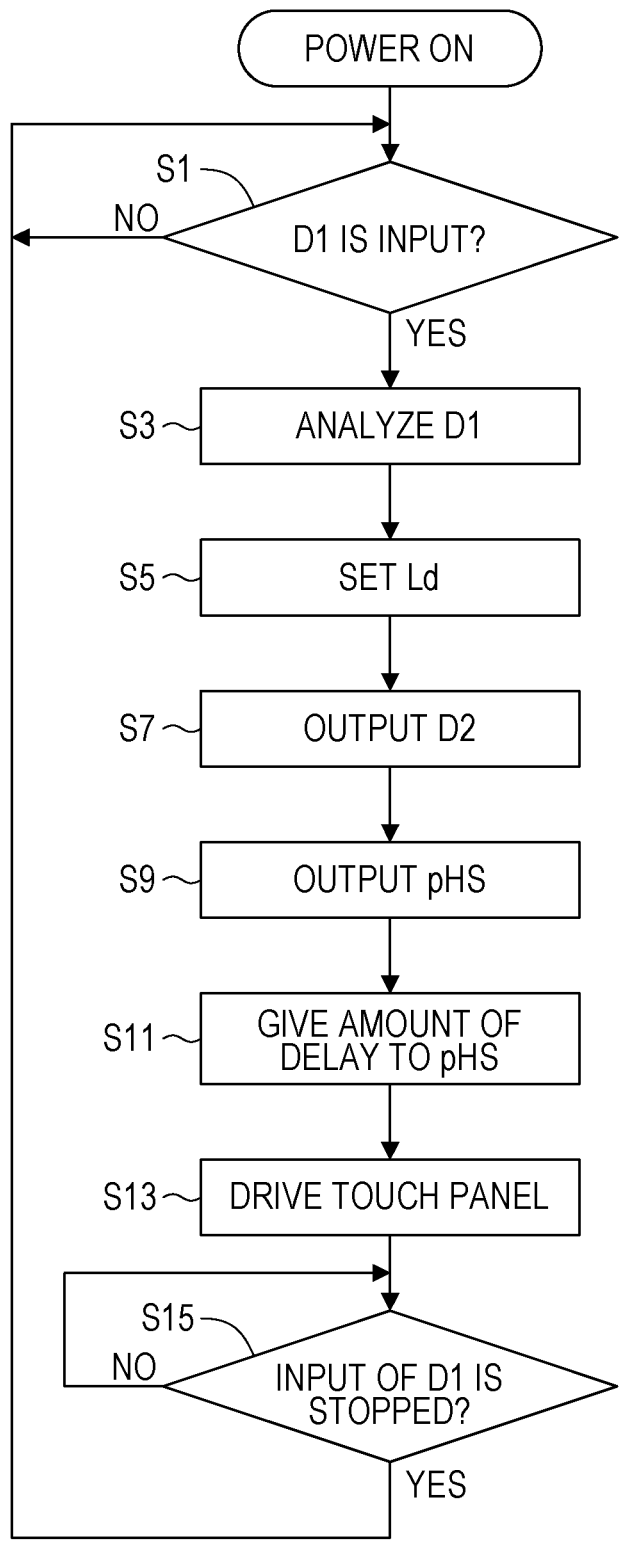
FIG. 9 is a flowchart illustrating an example of the entire process performed by the touch panel display according to the first embodiment.

FIG. 9 is a flowchart illustrating an example of the entire process performed by the touch panel display 10a according to the first embodiment.

As illustrated in FIG. 9, in response to turning on of the touch panel display 10a, in Step S1, the scaler 52 waits for input of the video signal D1 into the scaler 52. If the video signal D1 is input into the scaler 52 (YES in Step S1), in Step S3, the scaler 52 analyzes the kind of the video signal D1 that is input into the scaler 52. The result of the analysis is instantly transferred to the MCU 56 through the CPLD 54.

In Step S5, the MCU 56 sets the appropriate amount-of-delay Ld in the delay circuit 60 based on the result of the analysis by the scaler 52. The MCU 56 refers to the amount-of-delay table 124 at this time, as described above. In Step S7, the scaler 52 converts the video signal D1 into the converted video signal D2 and starts output of the converted video signal D2. The converted video signal D2 output from the scaler 52 is supplied to the liquid crystal module 30, specifically to the liquid crystal display-timing controller 34. As a result, a video according to the converted video signal D2 is displayed on the screen of the liquid crystal panel 32.

In Step S9, the scaler 52 starts output of the pseudo horizontal synchronization signal pHS. The pseudo horizontal synchronization signal pHS is supplied to the delay circuit 60. In Step S11, the delay circuit 60 gives the amount-of-delay Ld set by the MCU 56 to the pseudo horizontal synchronization signal pHS supplied from the scaler 52. The delayed horizontal synchronization signal dHS generated by the delay circuit 60 is supplied to the touch panel control board 70, specifically to the DBE 72.

In Step S13, the touch panel control board 70 including the DBE 72 starts driving of the touch panel 36. Specifically, the touch panel control board 70 including the DBE 72 starts input of the driving signal Tx into the touch panel 36 and starts acceptance of input of the position signal Rx from the touch panel 36. This activates the entire touch panel display 10a including the touch panel 36. The touch panel 36 is in the standby state during the standby period Lw based on the delayed horizontal synchronization signal dHS and the operation of the touch panel 36 is disabled. This avoids the influence of the gate driven noise N to suppress the malfunction of the touch panel 36.

In Step S15, the scaler 52 monitors stop of input of the video signal D1 into the scaler 52. If input of the video signal D1 into the scaler 52 is stopped (YES in Step S15), the process goes back to Step S1. The series of steps are terminated in response to turning off of the touch panel display 10a.

In the series of steps, the MCU 56 on the main interface board 50 performs an amount-of-delay setting process for setting the appropriate amount-of-delay Ld in the delay circuit 60 in accordance with the amount-of-delay setting program 114. The amount-of-delay setting process will now be described with reference to FIG. 10.

Figure 10:
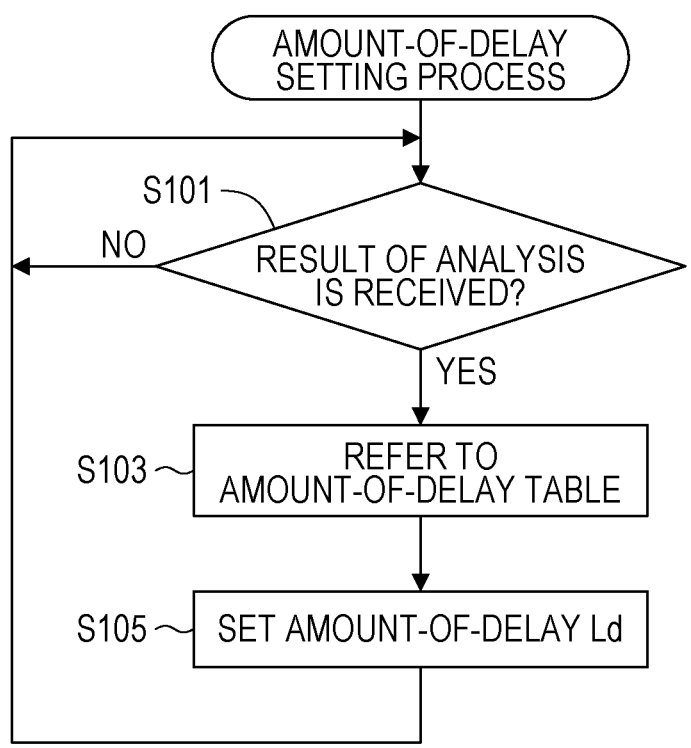
FIG. 10 is a flowchart illustrating an amount-of-delay setting process performed by the MCU on the main interface board in the first embodiment.

Referring to FIG. 10, in Step S101, the MCU 56 waits for reception of the result of analysis of the video signal D1 from the scaler 52. If the result of analysis of the video signal D1 is received from the scaler 52 (YES in Step S101), the process goes to Step S103.

In Step S103, the MCU 56 refers to the amount-of-delay table 124 to read out the appropriate amount-of-delay Ld corresponding to the video signal D1 input into the scaler 52 from the amount-of-delay table 124. Then, the process goes to Step S105.

In Step S105, the MCU 56 sets the amount-of-delay Ld read out in Step S103 in the delay circuit 60. Strictly, the MCU 56 controls the CPLD 54 so that the delay circuit 60 is formed of the flip-flops of a number corresponding to the amount-of-delay Ld. Then, the process goes back to Step S101.

The amount-of-delay setting process is also terminated in response to turning off of the touch panel display 10a.

As described above, according to the first embodiment, regardless of the kind of the video signal D1 input into the scaler 52, among the video signals D1 of multiple kinds, the appropriate amount-of-delay Ld corresponding to the kind of the video signal D1 is set in the delay circuit 60 to avoid the influence of the gate driven noise N. In other words, according to the first embodiment, it is possible to reliably avoid the influence of the gate driven noise N in the touch panel display 10a capable of supporting input of the video signals D1 of multiple kinds.

In addition, according to the first embodiment, also when the video signal D1 to be input into the scaler 52 is switched, it is possible to avoid the influence of the gate driven noise N. The first embodiment is very useful in this point.

Furthermore, according to the first embodiment, even if the specifications of the liquid crystal module 30 are varied, for example, appropriately setting the amount-of-delay Ld given by the delay circuit 60, that is, modification of the control program 112 (the amount-of-delay setting program 114) enables the variation of the specifications of the liquid crystal module 30 to be flexibly addressed. In other words, according to the first embodiment, it is possible to flexibly support the liquid crystal modules 30 having various specifications to realize the versatile touch panel display 10a.

In the liquid crystal module 30 in the first embodiment, the components other than the touch panel 36, specifically, a portion composed of the liquid crystal panel 32, the gate driving unit 32a, the source driving unit 32b, and the liquid crystal display-timing controller 34 is an example of a display apparatus according to the present disclosure. The scaler 52 is an example of a conversion unit according to the present disclosure and is also an example of a first generation unit according to the present disclosure. The video signal D1 input into the scaler 52 is an example of a first video signal according to the present disclosure and the converted video signal D2 converted by the scaler 52 is an example of a second video signal according to the present disclosure. The delay circuit 60 is an example of a delay performing unit according to the present disclosure. The MCU 56 on the main interface board 50 is an example of a setting performing unit according to the present disclosure and the memory 58 in the MCU 56 is an example of a storage unit according to the present disclosure. In other words, the MCU 56 including the memory 58 is an example of a setting unit according to the present disclosure and the MCU 56 and the delay circuit 60 are an example of a delay unit according to the present disclosure. The touch panel control board 70 is an example of a disabling unit according to the present disclosure. The standby period Lw is an example of a disabled period according to the present disclosure.

Second Embodiment

A second embodiment of the present disclosure will now be described.

Figure 11:
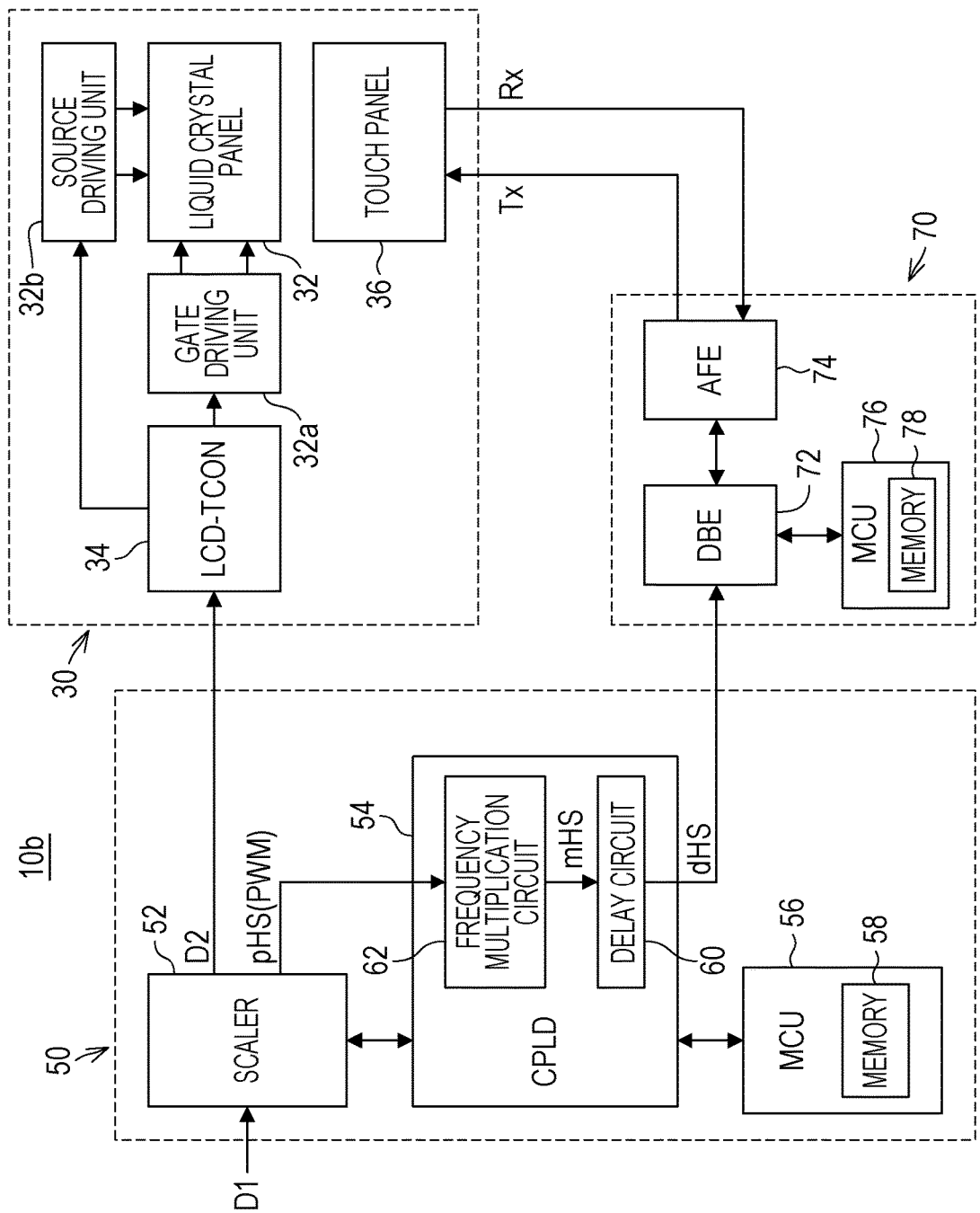
FIG. 11 is a block diagram schematically illustrating a configuration of an electrical portion of a touch panel display according to a second embodiment of the present disclosure.

A touch panel display 10b according to the second embodiment results from further modification of the touch panel display 10a according to the first embodiment. Specifically, as illustrated in FIG. 11, in the touch panel display 10b according to the second embodiment, a frequency multiplication circuit 62 is formed by the CPLD 54 and the pseudo horizontal synchronization signal pHS is supplied to the frequency multiplication circuit 62. The frequency multiplication circuit 62 multiplies the frequency of the input pseudo horizontal synchronization signal pHS by two. A multiplied synchronization signal mHS subjected to the multiplication by the frequency multiplication circuit 62 is supplied to the delay circuit 60. The remaining components in the touch panel display 10b according to the second embodiment are the same as those in the touch panel display 10a according to the first embodiment.

The frequency multiplication circuit 62 is provided in the touch panel display 10b according to the second embodiment, as described above. The frequency multiplication circuit 62 is provided for the following reasons.

The phase relationship between the gate clock signal GCK and the horizontal synchronization signal HS included in the converted video signal D2 may be shifted by about 180 degrees due to the difference between odd-number frame components in the converted video signal D2 and even-number frame components therein depending on the kind of the video signal D1 to be input into the scaler 52.

Specifically, as illustrated in FIGS. 12A to 12C, the phase relationship between the gate clock signal GCK and the pseudo horizontal synchronization signal pHS may be shifted by about 180 degrees. FIG. 12A illustrates the gate clock signal GCK. FIG. 12B illustrates the odd-number frame components of the pseudo horizontal synchronization signal pHS. FIG. 12C illustrates the even-number frame components of the pseudo horizontal synchronization signal pHS. In addition, the phase relationship between the gate clock signal GCK and the pseudo horizontal synchronization signal pHS may be shifted by about 180 degrees also due to the frequency of the dot clock signal DCK included in the converted video signal D2. If such a shift occurs in the phase relationship, the period when the gate driven noise N occurs is outside the standby period Lw and the influence of the gate driven noise N is not capable of being avoided. The frequency multiplication circuit 62 is provided in order to resolve this advantage.

FIGS. 13A and 13B illustrate the relationship between the gate clock signal GCK and the multiplied synchronization signal mHS subjected to the multiplication by the frequency multiplication circuit 62. FIG. 13A illustrates the gate clock signal GCK and FIG. 13B illustrates the multiplied synchronization signal mHS. As illustrated in FIGS. 13A and 13B, the multiplied synchronization signal mHS keeps fixed phase relationship with the gate clock signal GCK regardless of whether the phase relationship between the pseudo horizontal synchronization signal pHS on which the multiplied synchronization signal mHS is based and the gate clock signal GCK is shifted by about 180 degrees. Accordingly, input of the multiplied synchronization signal mHS into the delay circuit 60 resolves the disadvantage caused by the shift of the phase relationship between the gate clock signal GCK and the pseudo horizontal synchronization signal pHS by about 180 degrees to reliably avoid the influence of the gate driven noise N. This state is exemplified in FIGS. 14A to 14E. FIG. 14B illustrates the multiplied synchronization signal mHS. The pulse width of the multiplied synchronization signal mHS illustrated in FIG. 14B is made narrower (is made narrower than that of the multiplied synchronization signal mHS illustrated in FIG. 13B).

However, as apparent from FIGS. 14A to 14E, the standby periods Lw of a number corresponding to the multiplication number by the frequency multiplication circuit 62 are formed, that is, the two standby periods Lw are formed during one period Lg (refer to FIG. 3A) of the gate clock signal GCK in the second embodiment. As a result, the standby period Lw is redundantly formed also at timing when the gate driven noise N does not occur. This leads a reduction in the sensitivity of the touch panel 36. In contrast, since the gate driven noise N is capable of being reliably avoided in the second embodiment, as in the first embodiment, it is possible to achieve sufficient performance of the touch panel 36.

The frequency multiplication circuit 62 in the second embodiment is an example of a frequency multiplication unit according to the present disclosure. The multiplication number by the frequency multiplication circuit 62 is not limited to two and may be larger than two. However, the multiplication number by the frequency multiplication circuit 62 is desirably "two" in order to suppress the reduction in the sensitivity of the touch panel 36 as much as possible.

Although the frequency of the pseudo horizontal synchronization signal pHS is multiplied by the frequency multiplication circuit 62 and the multiplied synchronization signal mHS subjected to the multiplication by the frequency multiplication circuit 62 is supplied to the delay circuit 60 in the second embodiment, the second embodiment is not limited to this. For example, the multiplication process by the frequency multiplication circuit 62 may be performed to the delayed horizontal synchronization signal dHS after a delay is given to the pseudo horizontal synchronization signal pHS by the delay circuit 60 (in the first embodiment) and a signal subjected to the multiplication process by the frequency multiplication circuit 62 may be supplied to the touch panel control board 70. In other words, the frequency multiplication circuit 62 may be provided between the delay circuit 60 and the touch panel control board 70 (the DBE 72), instead of the provision of the frequency multiplication circuit 62 between the scaler 52 and the delay circuit 60. Also with this configuration, the disadvantage caused by the shift of the phase relationship between the gate clock signal GCK and the pseudo horizontal synchronization signal pHS by about 180 degrees is resolved to reliably avoid the influence of the gate driven noise N.

Third Embodiment

A third embodiment of the present disclosure will now be described.

Figure 15:
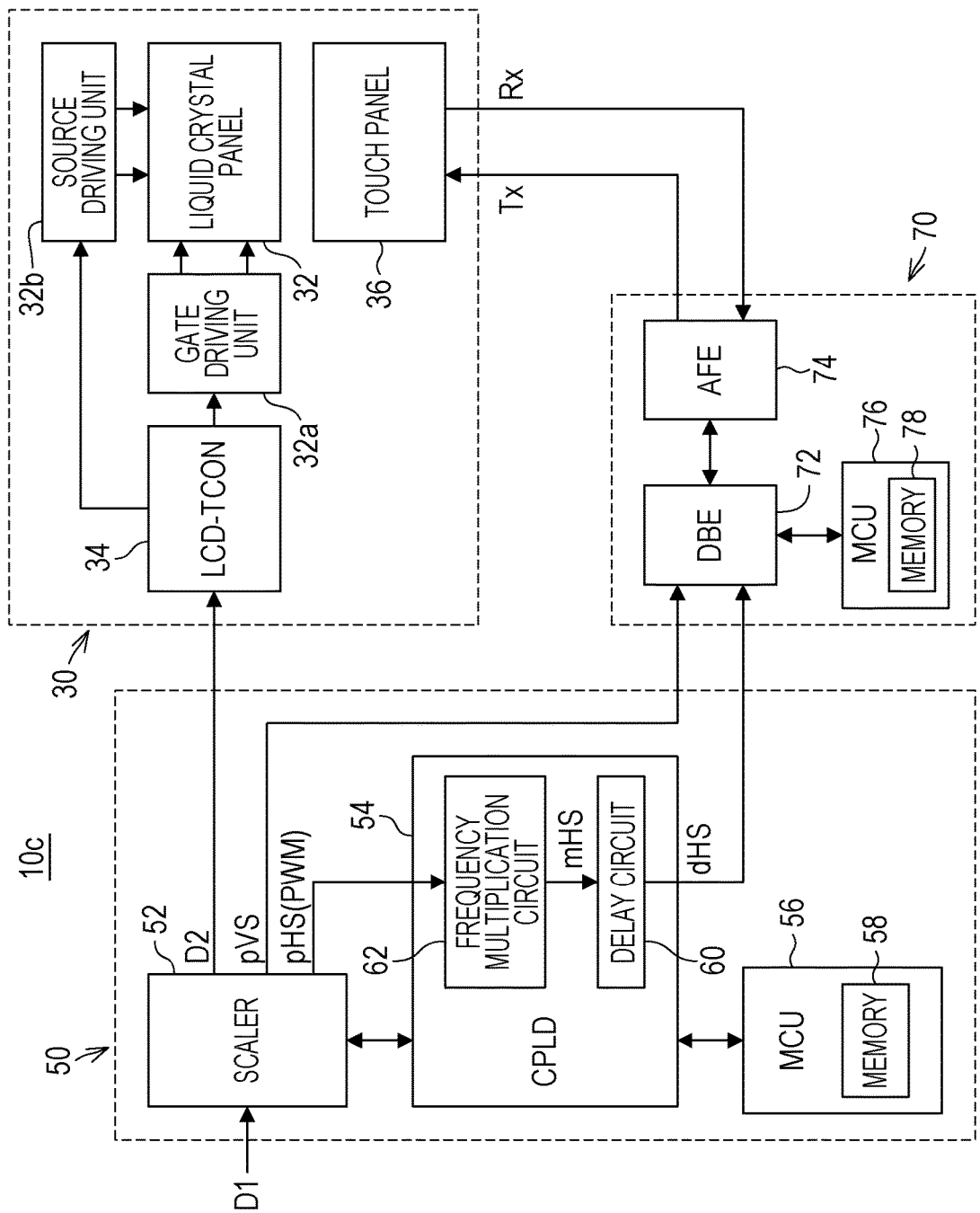
FIG. 15 is a block diagram schematically illustrating a configuration of an electrical portion of a touch panel display according to a third embodiment of the present disclosure.

A touch panel display 10c according to the third embodiment results from further modification of the touch panel display 10b according to the second embodiment. Specifically, as illustrated in FIG. 15, in the touch panel display 10c according to the third embodiment, a pseudo vertical synchronization signal pVS is output from the scaler 52. The pseudo vertical synchronization signal pVS is synchronized with the vertical synchronization signal VS included in the converted video signal D2. In other words, the scaler 52 has a function to generate the pseudo vertical synchronization signal pVS and, strictly, the ASIC composing the scaler 52 is designed so as to provide the function to generate the pseudo vertical synchronization signal pVS. The pseudo vertical synchronization signal pVS is supplied to the DBE 72 on the touch panel control board 70.

The DBE 72 generates the driving signal Tx in the above manner in cooperation with the AFE 74 and stops input of the driving signal Tx into the touch panel 36 during the standby period Lw based on the delayed horizontal synchronization signal dHS. In addition, the DBE 72 in the third embodiment operates in the following manner. Specifically, the DBE 72 continues input of the driving signal Tx into the touch panel 36 during a vertical blanking period based on the pseudo vertical synchronization signal pVS in cooperation with the AFE 74, regardless of the standby period Lw, to enable the operation of the touch panel. Specifically, the MCU 76 controlling the DBE 72 is modified so that input of the driving signal Tx into the touch panel 36 is continued during the vertical blanking period. That is, the touch panel control program 212 stored in the memory 78 in the MCU 76 is modified. The remaining components in the touch panel display 10c according to the third embodiment are the same as those in the touch panel display 10b according to the second embodiment.

As described above, according to the touch panel display 10c according to the third embodiment, the operation of the touch panel 36 is enabled during the vertical blanking period based on the pseudo vertical synchronization signal pVS, regardless of the standby period Lw. Since the gate of the liquid crystal panel 32 is not driven during the vertical blanking period, the gate driven noise N does not occur, that is, there is no influence of the gate driven noise N. Accordingly, according to the third embodiment in which the operation of the touch panel 36 is enabled during the vertical blanking period regardless of the standby period Lw, the sensitivity of the touch panel 36 is improved. In particular, in a configuration in which the sensitivity of the touch panel 36 is reduced due to the provision of the frequency multiplication circuit 62, the third embodiment is very useful to compensate the reduction in the sensitivity of the touch panel 36.

The pseudo vertical synchronization signal pVS in the third embodiment is an example of a second synchronization signal according to the present disclosure. The scaler 52, which generates the pseudo vertical synchronization signal pVS, is an example of a second generation unit according to the present disclosure.

Although the touch panel display 10c according to the third embodiment results from further modification of the touch panel display 10b according to the second embodiment, the same modifications may be made to the touch panel display 10a according to the first embodiment.

The content described in the above embodiments is only examples of the present disclosure and is not intended to limit the technical scope of the present disclosure. The present disclosure is applicable to aspects other than the above embodiments.

For example, although input of the driving signal Tx from the touch panel control board 70 into the touch panel 36 is stopped during the standby period Lw to disable the operation of the touch panel 36, the disablement of the operation of the touch panel 36 is not limited to this. As another example, acquisition of the position signal Rx from the touch panel 36 may be stopped on the touch panel control board 70, that is, the position signal Rx may be disregarded to disable the operation of the touch panel 36.

Alternatively, the processing of the driving signal Tx and the position signal Rx may be appropriately combined to disable the operation of the touch panel 36.

The touch panel 36 is not limitedly of the mutual capacitance type but may be of a self-capacitance type. In addition, the touch panel 36 is not limitedly of the projected capacitive types including the mutual capacitance type and the self-capacitance type but may be of a surface capacitive type. Furthermore, the touch panel 36 may be of a type, such as a resistive film type or a surface acoustic wave type, other than the capacitive type. Although the delay circuit 60 is formed by the CPLD 54, the formation of the delay circuit 60 is not limited to this. For example, the delay circuit 60 may be formed by a programmable logic device other than the CPLD 54. Alternatively, the delay circuit 60 may be formed of an ASIC or a combination of discrete components.

Although the standby period Lw is defined based on the rising edge of the delayed horizontal synchronization signal dHS, for example, as illustrated in FIGS. 5A to 5E, the standby period Lw may be defined based on a falling edge of the delayed horizontal synchronization signal dHS.

The present disclosure is desirable for the electronic blackboard described above. Specifically, on the electronic blackboard, the path of the positions where the touch panel 36 is touched by the user is displayed on the screen of the liquid crystal panel 32. For example, if the influence of the gate driven noise is not avoided on such an electronic blackboard, an involuntary pattern composed of points and lines that are not associated with the touch operation by the user is displayed on the screen of the liquid crystal panel 32 due to the influence of the gate driven noise. The present disclosure is very desirable to avoid such a disadvantage.

The present disclosure is also applicable to, for example, a configuration in which an organic electro-luminescence (EL) display of an active matrix drive type is adopted, instead of the liquid crystal module 30. In other words, the present disclosure is applicable to a configuration in which a display apparatus of an active matrix drive type is adopted. The present disclosure is also applicable to a display apparatus of a type other than the active matrix drive type, such as a display apparatus of a passive matrix drive type, extremely, to a display apparatus of a cathode ray tube (CRT) type.

The scope of the present disclosure is not limited to the scope described above and is indicated by the scope of the claims. In this case, the meaning and the entire scope equivalent to the scope of the claims are included in the present disclosure.

The present disclosure contains subject matter related to that disclosed in Japanese Priority Patent Application JP 2017-229840 filed in the Japan Patent Office on Nov. 30, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A touch panel control apparatus controlling a touch panel that is provided so that a screen of a display apparatus is overlaid with the touch panel and that outputs a position signal corresponding to a position where the touch panel is touched by a user, the touch panel control apparatus comprising:
conversion circuitry that is capable of accepting input of first video signals of multiple kinds and that converts the first video signal that is input into a second video signal meeting a signal input condition of the display apparatus and supplies the second video signal after the conversion to the display apparatus;
first generation circuitry that generates a first synchronization signal synchronized with a horizontal synchronization signal included in the second video signal;
delay circuitry that gives an amount of delay corresponding to a kind of the first video signal input into the conversion circuitry to the first synchronization signal; and
disabling control circuitry that disables an operation of the touch panel during a predetermined disabled period based on a delayed signal generated by the delay circuitry,
wherein the amount of delay is set in advance so that a period when noise occurs is within the disabled period, the noise appearing in the position signal due to driving of a gate of the display apparatus,
wherein the delay circuitry includes
delay performing circuitry that gives the set amount of delay to the first synchronization signal, and
setting circuitry that sets the amount of delay corresponding to the kind of the first video signal input into the conversion circuitry in the delay performing circuitry.

2. The touch panel control apparatus according to claim 1, wherein the setting circuitry includes
a storage unit in which multiple amounts of delay corresponding to the first video signals of multiple kinds are stored in advance, and
setting performing circuitry that reads out the amount of delay corresponding to the kind of the first video signal input into the conversion circuitry from the storage unit and that sets the amount of delay that is read out in the delay performing circuitry.

3. The touch panel control apparatus according to claim 1, wherein the touch panel is a capacitive touch panel.

4. The touch panel control apparatus according to claim 1, wherein the touch panel is provided on the screen of the display apparatus through direct bonding.

5. The touch panel control apparatus according to claim 1, wherein the conversion circuitry is a scaler.

6. The touch panel control apparatus according to claim 5, wherein the scaler includes the first generation circuits.

7. The touch panel control apparatus according to claim 1, further comprising:
an input display apparatus that displays information on its screen; and
a touch panel that is provided so that the screen of the input display apparatus is overlaid with the touch panel and that outputs a position signal corresponding to a position where the touch panel is touched by a user.

8. A touch panel control apparatus controlling a touch panel that is provided so that a screen of a display apparatus is overlaid with the touch panel and that outputs a position signal corresponding to a position where the touch panel is touched by a user, the touch panel control apparatus comprising:
conversion circuitry that is capable of accepting input of first video signals of multiple kinds and that converts the first video signal that is input into a second video signal meeting a signal input condition of the display apparatus and supplies the second video signal after the conversion to the display apparatus;
first generation circuitry that generates a first synchronization signal synchronized with a horizontal synchronization signal included in the second video signal;
delay circuitry that gives an amount of delay corresponding to a kind of the first video signal input into the conversion circuitry to the first synchronization signal; and
disabling control circuitry that disables an operation of the touch panel during a predetermined disabled period based on a delayed signal generated by the delay circuitry,
wherein the amount of delay is set in advance so that a period when noise occurs is within the disabled period, the noise appearing in the position signal due to driving of a gate of the display apparatus,
second generation circuitry that generates a second synchronization signal synchronized with a vertical synchronization signal included in the second video signal,
wherein the disabling control circuitry enables the operation of the touch panel regardless of the disabled period during a vertical blanking period based on the second synchronization signal.

9. The touch panel control apparatus according to claim 8, further comprising:
an input display apparatus that displays information on its screen; and
a touch panel that is provided so that the screen of the input display apparatus is overlaid with the touch panel and that outputs a position signal corresponding to a position where the touch panel is touched by a user.

10. A touch panel control apparatus controlling a touch panel that is provided so that a screen of a display apparatus is overlaid with the touch panel and that outputs a position signal corresponding to a position where the touch panel is touched by a user, the touch panel control apparatus comprising:
conversion circuitry that is capable of accepting input of first video signals of multiple kinds and that converts the first video signal that is input into a second video signal meeting a signal input condition of the display apparatus and supplies the second video signal after the conversion to the display apparatus;
first generation circuitry that generates a first synchronization signal synchronized with a horizontal synchronization signal included in the second video signal;
delay circuitry that gives an amount of delay corresponding to a kind of the first video signal input into the conversion circuitry to the first synchronization signal; and
disabling control circuitry that disables an operation of the touch panel during a predetermined disabled period based on a delayed signal generated by the delay circuitry,
wherein the amount of delay is set in advance so that a period when noise occurs is within the disabled period, the noise appearing in the position signal due to driving of a gate of the display apparatus, frequency multiplication circuitry that multiplies a frequency of the first synchronization signal or the delayed signal, wherein, when the frequency of the first synchronization signal is multiplied by the frequency multiplication circuitry, the delay circuitry gives the amount of delay to a multiplied signal subjected to the frequency multiplication by the frequency multiplication circuitry, instead of the first synchronization signal, and wherein, when the frequency of the delayed signal is multiplied by the frequency multiplication circuitry, the disabling control circuitry disables the operation of the touch panel during the disabled period based on the multiplied signal subjected to the frequency multiplication by the frequency multiplication circuitry, instead of the delayed signal.

11. The touch panel control apparatus according to claim 10, further comprising:

an input display apparatus that displays information on its screen; and a touch panel that is provided so that the screen of the input display apparatus is overlaid with the touch panel and that outputs a position signal corresponding to a position where the touch panel is touched by a user.

\* \* \* \* \*